United States Patent
Engstrom et al.

(10) Patent No.: US 7,502,633 B2
(45) Date of Patent: Mar. 10, 2009

(54) NESTED AND CONTEXT PRESERVED NAVIGATION FOR WIRELESS MOBILE DEVICE

(75) Inventors: G. Eric Engstrom, Kirkland, WA (US); Peter Zatloukal, Kirkland, WA (US)

(73) Assignee: Varia LLC, Seattle, WA (US)

( * ) Notice: Subject to any disclaimer, the term of this patent is extended or adjusted under 35 U.S.C. 154(b) by 212 days.

(21) Appl. No.: 10/686,339

(22) Filed: Oct. 14, 2003

(65) Prior Publication Data

US 2004/0077360 A1 Apr. 22, 2004

Related U.S. Application Data

(60) Provisional application No. 60/418,919, filed on Oct. 15, 2002.

(51) Int. Cl.
*H04B 1/38* (2006.01)
*G06F 3/00* (2006.01)
*H04M 1/00* (2006.01)
*G09G 5/02* (2006.01)

(52) U.S. Cl. .................... 455/566; 455/556.2; 455/557; 455/90.1; 345/594; 715/739; 715/744; 715/747

(58) Field of Classification Search ................. 455/466, 455/566, 556.2, 557, 90.1; 345/594, 581, 345/553; 715/707, 713, 738, 739, 744, 747, 715/763
See application file for complete search history.

(56) References Cited

U.S. PATENT DOCUMENTS

| | | | | |
|---|---|---|---|---|
| 6,263,217 | B1 * | 7/2001 | Park | 455/566 |
| 6,381,474 | B1 * | 4/2002 | Kraft | 455/566 |
| 6,415,164 | B1 * | 7/2002 | Blanchard et al. | 455/566 |
| 6,608,637 | B1 * | 8/2003 | Beaton et al. | 715/762 |
| 6,725,022 | B1 * | 4/2004 | Clayton et al. | 455/154.1 |
| 6,975,710 | B2 * | 12/2005 | Fujino et al. | 379/93.09 |
| 7,092,495 | B2 * | 8/2006 | Kraft et al. | 379/88.11 |
| 7,137,073 | B2 * | 11/2006 | Kim et al. | 715/828 |
| 2002/0077158 | A1 * | 6/2002 | Scott | 455/567 |
| 2002/0173299 | A1 * | 11/2002 | Buchholz et al. | 455/418 |
| 2003/0013483 | A1 * | 1/2003 | Ausems et al. | 455/556 |
| 2003/0032455 | A1 * | 2/2003 | Watanabe et al. | 455/566 |
| 2004/0142720 | A1 * | 7/2004 | Smethers | 455/550.1 |

* cited by examiner

*Primary Examiner*—George Eng
*Assistant Examiner*—Un Cho
(74) *Attorney, Agent, or Firm*—Schwabe Williamson & Wyatt P.C.

(57) ABSTRACT

A wireless mobile device is equipped with a menu driver that facilitates direct navigation between main menu items or activities. In one embodiment, a user may navigate from a last sub-menu item/sub-activity state of a menu item/activity to another last sub-menu item/sub-activity state of another menu item/activity. In one embodiment, sub-menu items or sub-activities are presented as in place scroll list replacing a selected sub-menu item/sub-activity.

14 Claims, 5 Drawing Sheets

300

NESTED AND CONTEXT PRESERVED NAVIGATION FOR WIRELESS MOBILE DEVICE

RELATED APPLICATIONS

This non-provisional patent application claims priority to U.S. provisional patent application No. 60/418,919, entitled "NESTED AND CONTEXT PRESERVED NAVIGATION FOR WIRELESS MOBILE DEVICE", filed on Oct. 15, 2002 and having common inventorship with the present application, which is hereby fully incorporated by reference.

FIELD OF THE INVENTION

The present invention relates to the field of mobile devices. More specifically, the present invention is related to adding input/output (I/O) ports to mobile devices, such as wireless mobile phones, personal digital assistants (PDA) and so forth, via smart interchangeable covers.

BACKGROUND OF THE INVENTION

Since their introduction, the capabilities and the number of services and features for cellular telephones have steadily increased while the cost of ownership and operation has decreased. At first, these mobile telecommunication devices operated on analog wireless networks that enabled voice communication and simple paging features. Later, digital wireless networks were introduced for cellular telephones to provide more advanced features for voice and data communication, such as encryption, caller identification and transmitting and receiving short message service (SMS) text messages.

Some cellular telephones also incorporate many of the features originally provided for in handheld electronic devices, such as personal digital assistants (PDAs). Relatively simple PDA features such as keeping a list of contacts, a calendar, appointments, and the like have been generally integrated into recent cellular telephone models.

More recently, some cellular telephones enable the browsing of web pages on the Internet or other on-line services.

However, unlike PC, cellular telephones or wireless mobile devices are inherently limited in their input capability. Often time complex operations have to be accomplished or navigated using a standard 12-key input keypad.

FIG. 1 illustrates a typical prior art approach to navigating a menu. As illustrated, typically, the top menu items, "message", "call log", "profile", "setting", and so forth have to be navigated with a predetermined entry item. For the illustrated embodiment, it is the "message" menu item. From there, the top menu items may be navigated in a predetermined round robin order. From each of the top menu items, the user may return to the "root" of the menu.

Each of the top menu items includes sub-menu items. For ease of understanding, only the "call log" menu item is illustrated in an expanded form showing the sub-menu items under the particular top menu item.

Similar to the top menu items, the sub-menu items, "missed calls", "dialed calls", "received calls" and so forth have to be navigated with a predetermined entry sub-menu item. For the illustrated embodiment, it is the "missed calls" sub-menu item. From there, the sub-menu items of "call long" may be navigated in a predetermined round robin order. From each of the sub-menu items, the user may return to the "call log" top menu item.

Each of the sub-menu items may further include additional sub-menu items. Again, for ease of understanding, only the sub-menu items of the "received calls" sub-menu item are illustrated in an expanded form.

The sub-menu items of a sub-menu item may be navigated in a similar manner.

In other words, under the prior art navigation system, once navigated into a sub-menu item level, a user has to back track to the entry top menu item, before being able to navigate into the sub-menu items of another top menu item. Moreover, once navigated to the sub-menu items of another top menu item, the user has to similarly back track and re-navigate back to a previous sub-menu item, if a need/desire arises to a previously navigated sub-menu item.

Thus, typical prior art navigation approaches are relatively cumbersome, and especially undesirable for input facilities limited wireless mobile devices, such as wireless mobile phones.

Accordingly, a need exists for a more efficient and friendly manner of navigation between menu items and/or activities.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Embodiments of the present invention include a novel approach to navigate a menu or different activities, having particular application to wireless mobile devices, such as wireless mobile phones.

Parts of the description will be presented in terms, such as mobile devices, menus, activities, and so forth, consistent with the manner commonly employed by those skilled in the art to convey the substance of their work to others skilled in the art. As well understood by those skilled in the art, the terms "mobile devices" as used herein, including in the claims, comprise wireless mobile phones, PDA, and other devices of the like.

In the following description, various aspects of the illustrated embodiments will be described. However, it will be apparent to those skilled in the art that other embodiments may be practiced with only some aspects of the illustrated embodiments. For purposes of explanation, specific numbers, materials and configurations are set forth in order to provide a thorough understanding of the present invention. However, it will be apparent to one skilled in the art that other embodiments may be practiced without the specific details. In other instances, well-known features are omitted or simplified in order not to obscure the illustrated embodiments.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. The phrase "in one embodiment" is used repeatedly. The phrase generally does not refer to the same embodiment, however, it may; The terms "comprising", "having" and "including" are synonymous, unless the context dictates otherwise.

Figure 1:
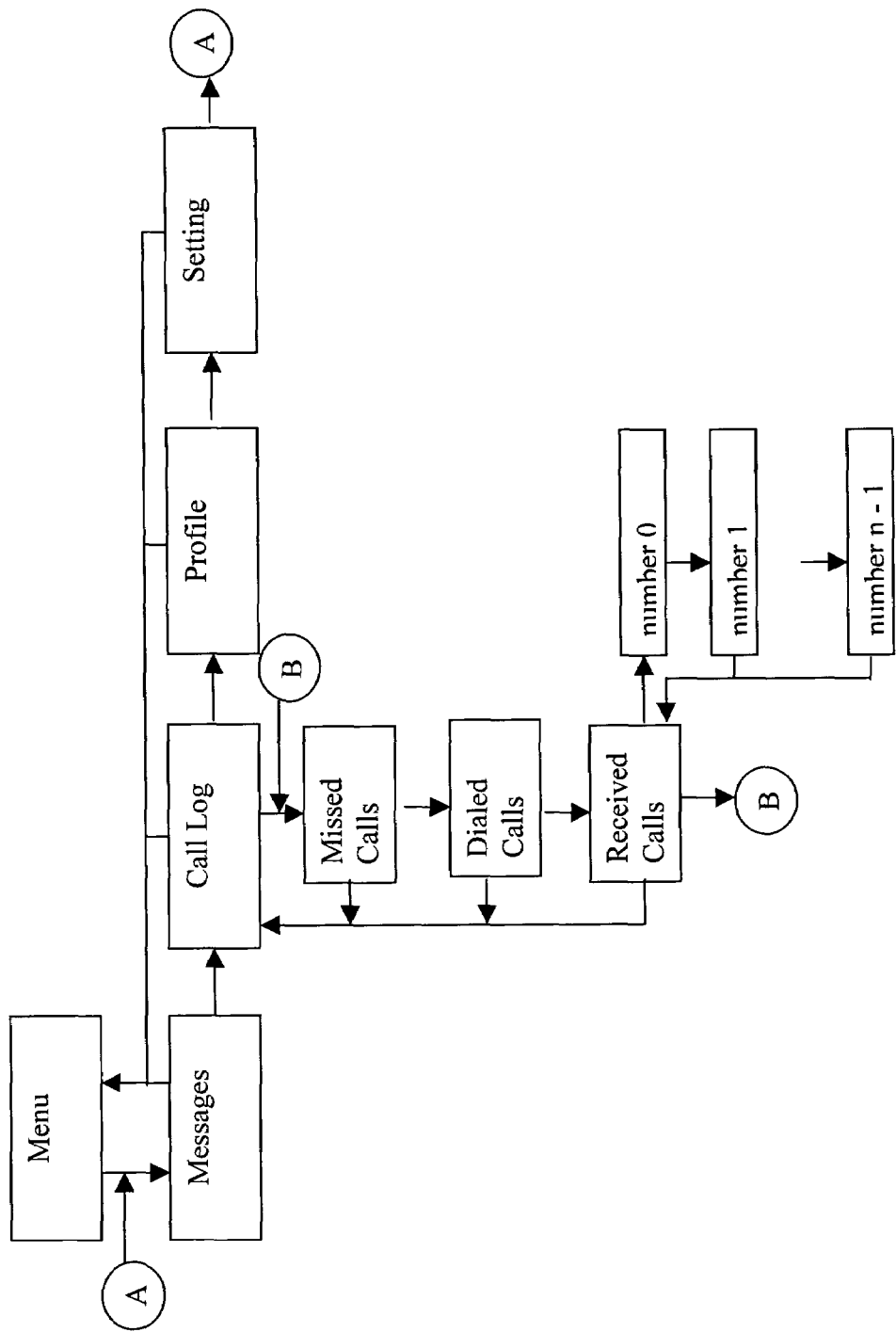
FIG. 1 illustrates a typical prior art approach to navigating a complex set of menus for wireless mobile devices.
Figure 2:
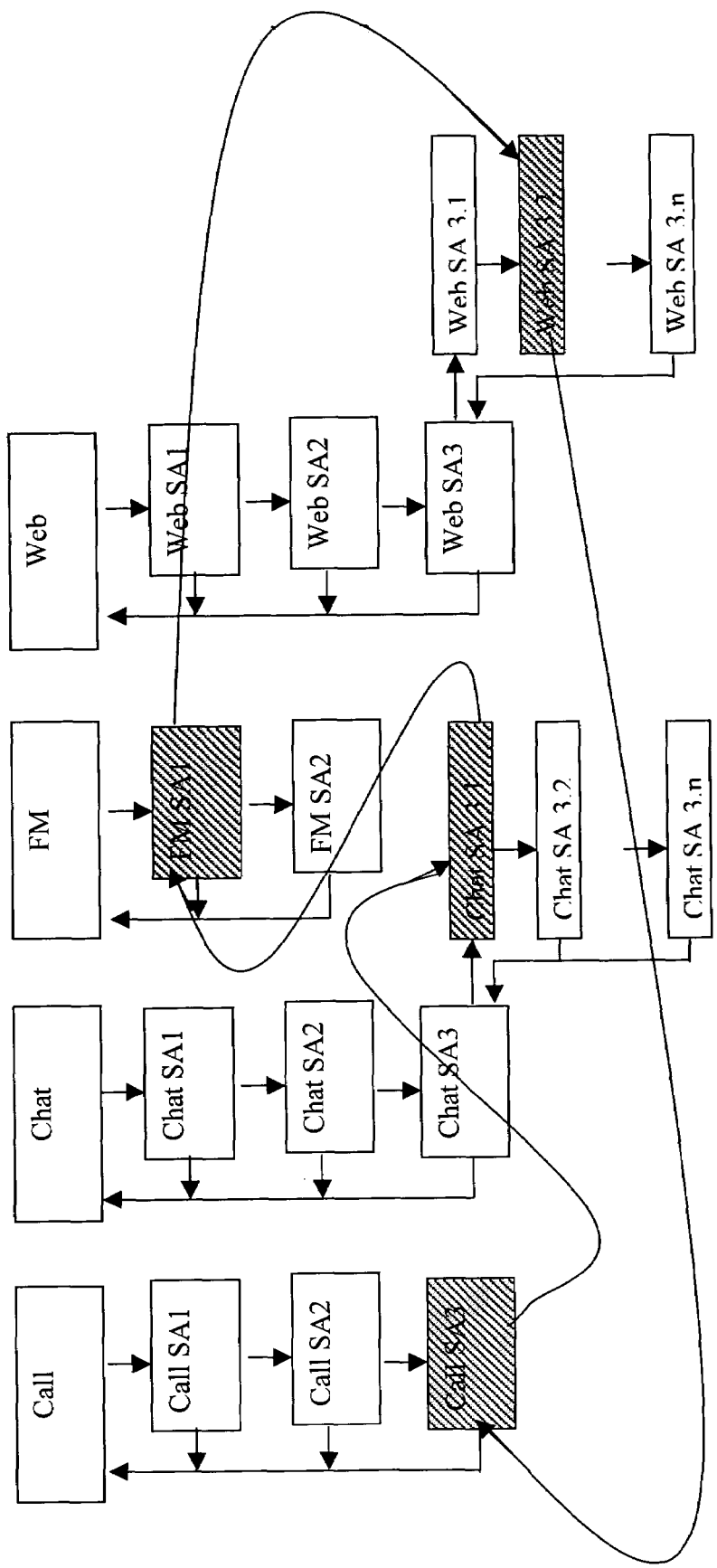
FIG. 2 illustrates the context preserving approach to navigation of the present invention, in accordance with one embodiment and a first aspect of the present invention.

FIG. 2 illustrates the novel navigation approach of the present invention, in accordance with one embodiment and a first aspect. As illustrated, a number of activities, such as call, chat, radio (FM), and web browsing, may be performed on a host wireless mobile device, such as a wireless mobile phone. Each of the activities may include sub-activities. Each of the sub-activities may further include one or more additional sub-activities.

The present invention enables a user to navigate from one activity to another directly, without having to first back track up to a top activity level before navigating to the new activity of interest, and navigate down. When entering an activity, the present invention places the user at a sub-activity where the user was, the last time the user left the activity. This last state is illustrated in FIG. 2 by the fill pattern.

Accordingly, under the present invention, a user may navigate from activity to activity directly. More particular, a user may navigate from one last sub-activity state of one activity to another last sub-activity state of another activity.

Resultantly, navigation is more direct and efficient under the present invention.

Figure 3A:
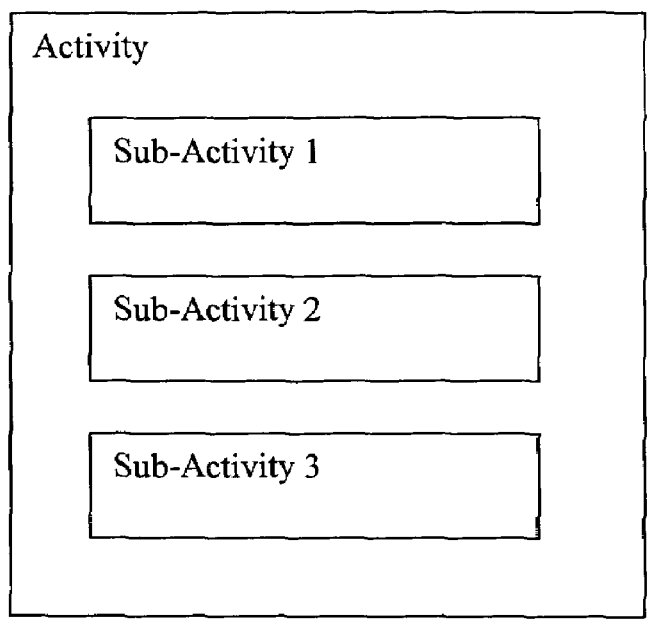
FIGS. 3a-3b illustrate a nested approach to navigation of the present invention, in accordance with one embodiment and a second aspect of the present invention.
Figure 3B:
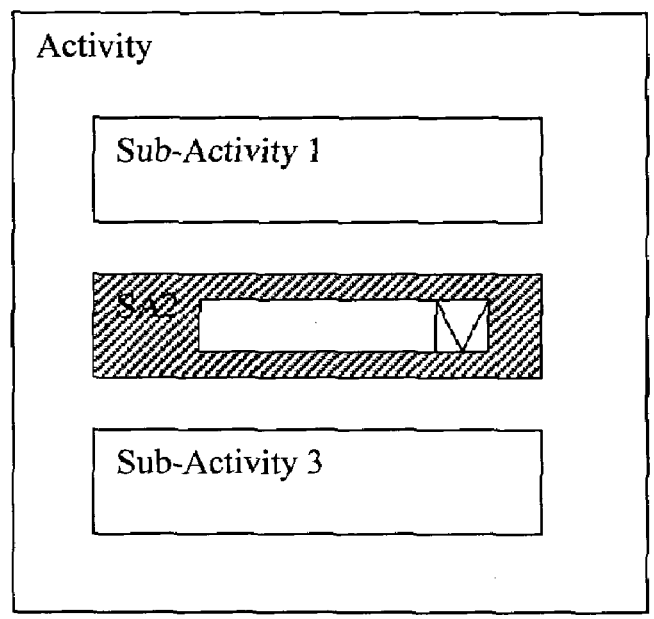

FIGS. 3a-3b illustrate a nested navigation approach of the present invention, in accordance with one embodiment and a second aspect. As illustrated, each activity is displayed with a number of sub-activities, subject to the constraint of the display space of the host wireless mobile device.

Whenever an expandable sub-activity is selected, i.e. a sub-activity with sub-activities, the sub-activities of the selected sub-activity are presented for selection as an "in place scroll list" replacing the selected sub-activity.

For example, for the earlier described menu of "message", "call log" and so forth, the menu items are all presented at the same time. When, e.g. "call log" is selected, an in place scrollable list of the sub-menu items under "call log" is presented for selection, replacing the previously displayed "call log" entry.

Figure 4:
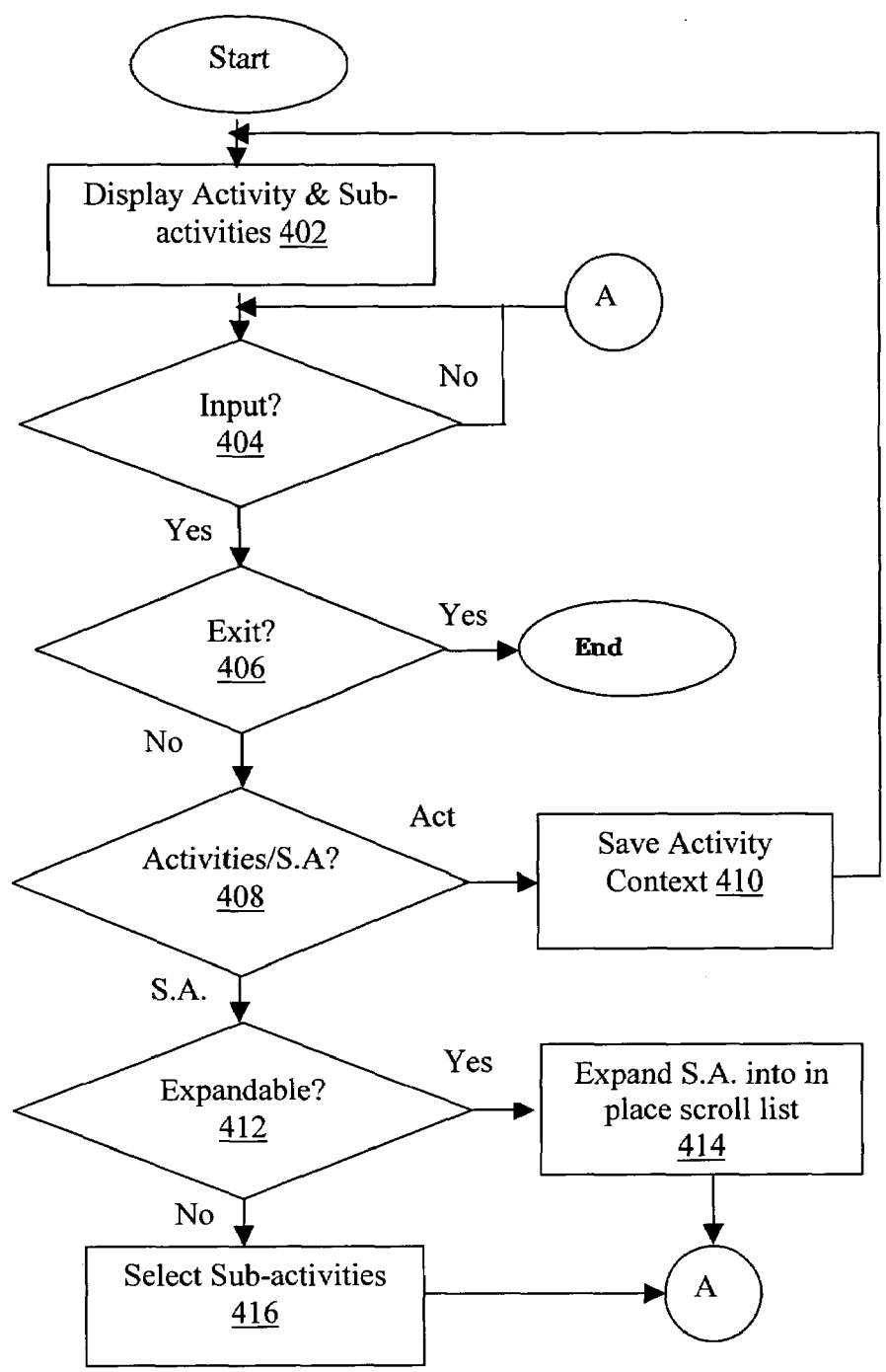
FIG. 4 illustrates the operational flow of the relevant aspects of a menu manager, in accordance with one embodiment.

FIG. 4 illustrates the operational flow of the relevant aspects of a menu driver equipped with the teaching of the present invention. As illustrated, menu driver, first displays the top menu items or activities, block 402, then waits for user inputs, block 404.

Upon receipt of a user input, the menu driver determines whether the input is to exit the menu system or terminates all activities, i.e. shut down, block 406. If so, the menu system is exited or the activities are terminated accordingly.

If not the menu driver determines if the user is switching to another activity or having selected a sub-activity of the current activity, block 408. If it is the former, the menu driver saves the last sub-menu item or sub-activity state of the last activity, block 410, and then displays the new activity with its sub-activity, block 402. Moreover, as described earlier, in a preferred embodiment, the menu driver places the user at the last sub-menu or sub-activity where the user was, the last time the user left the activity.

On the other hand, if a sub-activity is selected, the menu driver further determines if the selected menu item or sub-activity is an expandable menu item or sub-activity, block 412. If the selected sub-menu item or sub-activity is an expandable item, in a preferred embodiment, the sub-menu items of the selected sub-menu item or the sub-activities of the selected sub-activity was presented as an in place scrollable list for interaction or selection, replacing the selected sub menu item or sub-activity, block 414.

If the selected sub-menu item or sub-activity is not an expandable item, the selection is noted, block 416.

From either block 414 or 416, the process continues back at block 402.

Figure 5:
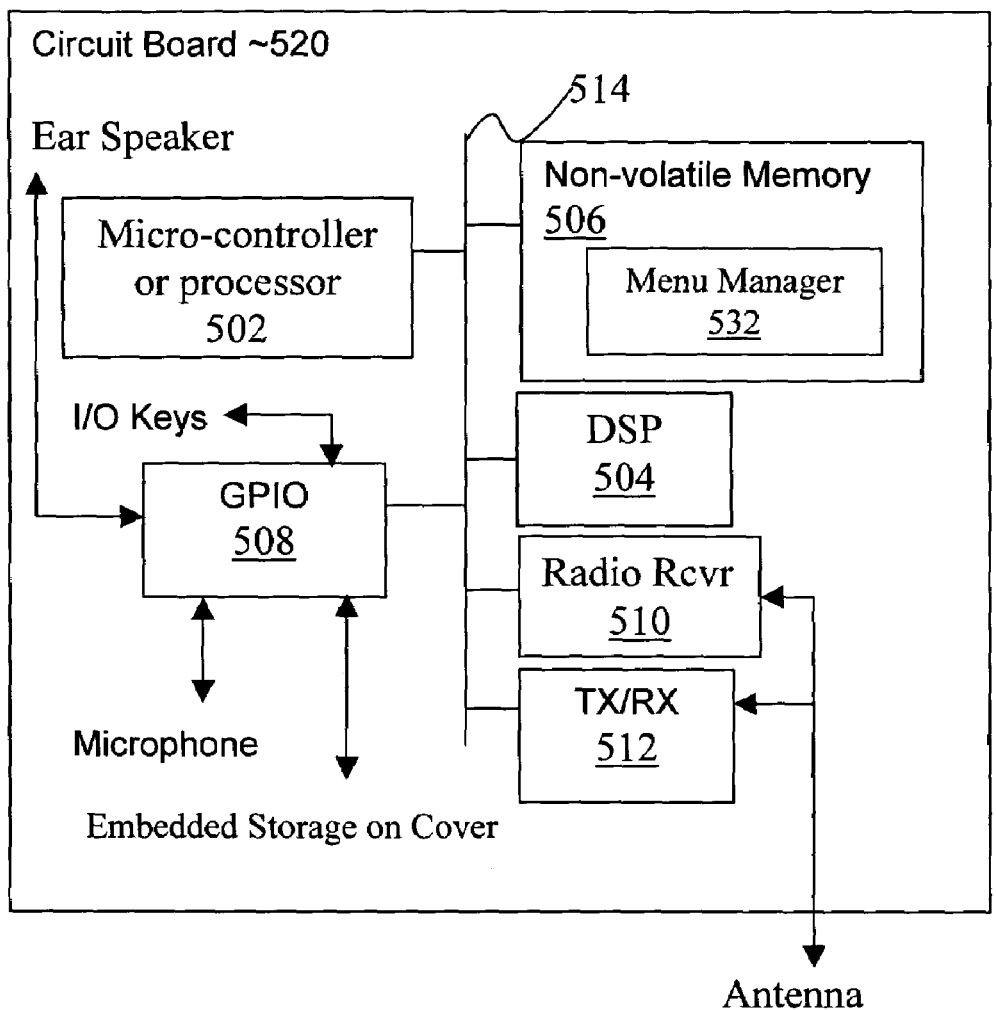
FIG. 5 illustrates an architectural view of a wireless mobile device incorporated with teachings of the present invention, in accordance with one embodiment.

FIG. 5 illustrates a mobile device 300 incorporated with the teachings of the present invention, in accordance with one embodiment. As alluded to earlier, for the illustrated embodiment, mobile device 300 is a wireless mobile phone; however, for other embodiments, mobile device 300 may be other mobile devices, including but are not limited to PDA.

As illustrated in FIG. 5, core unit of wireless mobile phone 300 includes conventional elements, such as micro-controller/processor 502, digital signal processor (DSP) 504, non-volatile memory 506, general purpose input/output (GPIO) interface 508, radio receiver 510, and transmit/receive (TX/RX) 512 (also known as a transceiver), coupled to each other via bus 514, and disposed on a circuit board 520. The core unit also includes a number of I/O keys (including e.g. a menu/activity navigation button) coupled to the GPIO interface 508 to facilitate provision of user inputs, including menu/activity navigation inputs.

The core unit of wireless mobile phone 300 is endowed with functions in support of earlier described activities, and a software implementation of a menu driver 532 in support of the earlier described approach to navigation.

Except for menu driver 532 provided to mobile device 300, each of these functions and elements 502-514 performs its conventional function known in the art, and is intended to represent a broad range of such function/element and its equivalents. In particular, TX/RX 512 may be designed to support one or more of any of the known signaling protocols, including but are not limited to CDMA, TDMA, GSM, and so forth. Moreover TX/RX 512 may be implemented using separate transmitter and receiver.

Accordingly, these functions and elements 502-514 will not be further described.

CONCLUSION AND EPILOGUE

Thus, it can be seen from the above descriptions, a novel navigation method, having particular application to wireless mobile devices, such as wireless mobile phones, has been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A mobile communication device comprising:
   a plurality of functions to support a plurality of activities to be performed using the mobile communication device, the activities including at least a call activity;
   a navigation button; and
   a menu driver to facilitate a user to navigate directly from one activity to another, in response to user inputs provided through the navigation button, the menu driver adapted to:
      facilitate a user in navigating, in a sequence comprising navigating from any state of a first activity to an initial state of a second activity, from the initial state of the second activity to a selected state of the second activity, and from the selected state to any state of a third activity, each facilitated without interveningly navigating to any other navigational states capable of receiving user input, the second activity different from the first and third activities;

saving the selected state of the second activity; and enabling subsequent re-entry into the saved selected state of the second activity from the any state of the third activity without interveningly navigating to any other navigational state capable of receiving user input.

2. The mobile communication device of claim 1, wherein the second activity is an activity selected from a call activity, a chat activity, a radio activity, and a web browsing activity; and the first and third activities are different activities selected from the call activity, the chat activity, the radio activity, and the web browsing activity.

3. The mobile communication device of claim 1, wherein the menu driver is further designed to facilitate a user to interact with selectable sub-activities of an activity as a nested scrollable list of selectable sub-activities of the activity.

4. The mobile communication device of claim 1, wherein the mobile communication device comprises a wireless mobile phone.

5. The mobile communication device of claim 1 wherein the first and third activities are the same activity.

6. The mobile communication device of claim 1 wherein the any state of the first activity and the any state of the third activity are the same state.

7. A mobile communication device comprising:

a plurality of functions to support a plurality of activities to be performed using the mobile communication device;

a navigation button; and a menu driver to facilitate a user to navigate directly from one activity to another, in response to user inputs provided through the navigation button, the menu driver adapted to:

facilitate the user in navigating, in a sequence comprising navigating from any state of a first activity to an initial state of a second activity, from the initial state of the second activity to a selected state of the second activity, and from the selected state to any state of a third activity, each facilitated without interveningly navigating to any other navigational states capable of receiving user input, the second activity different from the first and third activities;

save the selected state of the second activity; and enable subsequent re-entry into the saved selected state of the second activity from the any state of the third activity without interveningly navigating to any other navigational state capable of receiving user input;

wherein the menu driver is further configured to facilitate a user to navigate among selectable sub-activities of an expandable sub-activity of one of said first, second or third activity, including presenting the selectable sub-activities as a scrollable list nested in a presentation of the activity, the scrollable list replacing the expandable sub-activity and displaying only a one of the selectable sub-activities at a time.

8. The mobile communication device of claim 7 wherein the activity is a selected one of a call activity, a chat activity, a radio activity, and a web browsing activity.

9. The mobile communication device of claim 7, wherein the mobile communication device comprises a wireless mobile phone.

10. In a mobile communication device, a method of operation, comprising:

facilitating a user in navigating, in a sequence comprising navigating from any state of a first activity to an initial state of a second activity, from the initial state of the second activity to a selected state of the second activity, and from the selected state to any state of a third activity, each facilitated without interveningly navigating to any other navigational states capable of receiving user input, the second activity different from the first and third activities;

saving the selected state of the second activity; and enabling subsequent re-entry into the saved selected state of the second activity from the any state of the third activity without interveningly navigating to any other navigational state capable of receiving user input;

wherein the method further comprising receiving a user navigation input while in either the first or third activity; and in response, navigating directly from the first or third activity to the saved selected state of the second activity.

11. The method of claim 10, wherein the first activity is an activity selected from a call activity, a chat activity, a radio activity, and a web browsing activity; and the second activity is a different activity selected from the call activity, the chat activity, the radio activity, and the web browsing activity.

12. The method of claim 11, further comprising facilitating a user in interacting with selectable sub-activities of an activity as a nested scrollable list of selectable sub-activities of the activity.

13. In a mobile communication device, a method of operation, comprising:

facilitating a user in navigating, in a sequence comprising navigating from any state of a first activity to an initial state of a second activity, from the initial state of the second activity to a selected state of the second activity, and from the selected state to any state of a third activity, each facilitated without interveningly navigating to any other navigational states capable of receiving user input, the second activity different from the first and third activities;

saving the selected state of the second activity; and enabling subsequent re-entry into the saved selected state of the second activity from an any state of the third activity without interveningly navigating to any other navigational state capable of receiving user input, wherein the method further comprises:

receiving a user navigation input; and in response, navigating among a plurality of selectable sub-activities of an expandable sub-activity of one of said first, second or third activities, including presenting the selectable sub-activities as a scrollable list nested in a presentation of the activity, the scrollable list replacing the expandable sub-activity and displaying only a one of the selectable sub-activities at a time.

14. The mobile communication device of claim 13, wherein the activity is a selected one of a call activity, a chat activity, a radio activity, and a web browsing activity.

* * * * *